(12) United States Patent
Kawasaki et al.

(10) Patent No.: US 8,368,900 B2
(45) Date of Patent: Feb. 5, 2013

(54) LIGHTWAVE INTERFEROMETRIC DISTANCE MEASURING METHOD AND APPARATUS USING AN OPTICAL COMB

(75) Inventors: Kazuhiko Kawasaki, Ibaraki (JP); Kaoru Miyata, Ibaraki (JP)

(73) Assignee: Mitutoyo Corporation, Kanagawa (JP)

(*) Notice: Subject to any disclaimer, the term of this patent is extended or adjusted under 35 U.S.C. 154(b) by 633 days.

(21) Appl. No.: 12/511,406

(22) Filed: Jul. 29, 2009

(65) Prior Publication Data
US 2010/0026983 A1   Feb. 4, 2010

(30) Foreign Application Priority Data

Jul. 31, 2008   (JP) ................. 2008-198312

(51) Int. Cl.
*G01B 11/02* (2006.01)
(52) U.S. Cl. ...................................... 356/498
(58) Field of Classification Search ........... 356/450–521
See application file for complete search history.

(56) References Cited

U.S. PATENT DOCUMENTS

| | | | |
|---|---|---|---|
| 6,285,456 B1 | 9/2001 | Narumi | |
| 6,493,091 B2* | 12/2002 | Kourogi et al. | 356/489 |
| 7,440,112 B2* | 10/2008 | Kurokawa et al. | 356/495 |
| 7,898,669 B2* | 3/2011 | Kim et al. | 356/486 |
| 2007/0024860 A1 | 2/2007 | Tobiason et al. | |

FOREIGN PATENT DOCUMENTS

| | | |
|---|---|---|
| EP | 1750086 | 2/2007 |
| JP | 9-61109 | 3/1997 |
| JP | 2000-146517 | 5/2000 |

OTHER PUBLICATIONS

Mariko Kajima, Super-heterodyne laser interferometer using femtosecond frequency comb for linear encoder calibration syste, Jun. 18, 2007, vol. 6166, pp. 1-5.*
Database Medline [Online], US National Library of Medicine (NLM), Bethesda, MD, US, May 10, 2008, Salvade Yves et al, "High-accuracy absolute distance measurement using frequency comb referenced multiwavelength source", XP002557438, Database accession No. NLM18470268, the whole document & Applied Optics, May 10, 2008, vol. 47, No. 14, May 10, 2008, pp. 2715-2720, ISSN: 0003-6935.
Jin et al., "Absolute length calibration of gauge blocks using optical comb of a femtosecond pulse laser", Optics Express 20060626 Optical Society of America US, vol. 14, No. 13, Jun. 26, 2006, pp. 139-145, XP002557437.
English language Abstract of JP 2000-146517, May 26, 2000.
English language Abstract of JP 9-61109, Mar. 7, 1997.

* cited by examiner

Primary Examiner — Tarifur Chowdhury
Assistant Examiner — Michael P LaPage
(74) Attorney, Agent, or Firm — Greenblum & Bernstein, P.L.C.

(57) ABSTRACT

The oscillation wavelength of a variable wavelength laser is measured by using an optical comb, and a feedback control is performed, whereby laser beams of plural predetermined wavelengths are obtained, or a variable wavelength laser is caused to oscillate at plural arbitrary wavelengths to obtain plural distance measurement values. The wavelengths (frequencies) of laser beams when the respective distance measurement values are obtained are measured by the optical comb, and used in calculation of the geometric distance. Plural lasers are used, and the geometric distance is obtained while the wavelengths of laser beams oscillated from the lasers are measured by the optical comb.

5 Claims, 8 Drawing Sheets

LIGHTWAVE INTERFEROMETRIC DISTANCE MEASURING METHOD AND APPARATUS USING AN OPTICAL COMB

TECHNICAL FIELD

The present invention relates to a lightwave interferometric distance measuring method and apparatus, and more particularly to improvements in a lightwave interferometric distance measuring method and apparatus which accurately measure a geometric distance from the body of an interferometer to a target from a distance measurement value that is obtained by a lightwave interferometric measurement using laser beams of plural wavelengths, while correcting the refractive index of air.

RELATED ART

As a method of accurately measuring a geometric distance from the body to a target or a displacement of a target, a distance measurement using lightwave interference is known.

The distance measurement using lightwave interference is an accurate measuring method which uses the wavelength of light as a scale (see Patent Reference 1). The wavelength of light is converted from the frequency of the light the value of which is determined on the basis of an accurate time reference, and indicates the length in vacuum. In an actual measurement environment, therefore, the wavelength change due to the refractive index of air must be corrected. However, the refractive index of air is changed depending on the environment such as the temperature, the humidity, and the atmospheric pressure. In order to perform a correct correction, therefore, an apparatus for correctly measuring the environment is additionally required.

On the other hand, as a method of reducing an error (uncertainty) due to the refractive index of air without observing a change of the environment such as the temperature and the humidity, the two-wavelength method has been proposed (see Patent Reference 2). In the two-wavelength method, the geometric distance L from the body of an interferometer to an object (target) is calculated from distance measurement values $D_1$, $D_2$ which are obtained by a lightwave interferometric measurement using two different wavelengths $\lambda_1$, $\lambda_2$, and which are affected by the air refractive index. The distance L can be calculated by following Expression (1) using a constant A which corresponds to the wavelength to be used.

$$L = D_2 - A(D_2 - D_1) \qquad (1)$$

The distance measurement values $D_1$, $D_2$ are largely affected by the stabilities of the two laser frequencies to be used. In order to accurately obtain the values, therefore, lasers having a very high stability are required.

[Patent Reference 1] JP-A-2000-146517
[Patent Reference 2] JP-A-9-61109

However, a laser in which the frequency is correctly set is expensive, and the wavelength is limited. Therefore, the theory of refractive index correction is impeded from being realized effectively or easily.

SUMMARY

The invention has been conducted in order to solve the problems of the prior art. It is an object of the invention to provide a distance measuring apparatus which can perform an interferometric measurement of a geometric distance while an influence of the refractive index of air is reduced, which does not use an expensive laser having a high stability, and which is not expensive.

According to the invention, a lightwave interferometric distance measuring method includes steps of: obtaining a plurality of distance measurement values by a lightwave interferometric measurement using laser beams of plural wavelengths; accurately measuring a geometric distance from a body of an interferometer to a target from the distance measurement values, while correcting a refractive index of air; and measuring the wavelengths of the laser beams by using an optical comb.

The lightwave interferometric distance measuring method further includes a step of: obtaining laser beams of a plurality of predetermined wavelengths by performing a feedback control based on an oscillation wavelength of a variable wavelength laser measured by using the optical comb.

In the lightwave interferometric distance measuring method, the step of obtaining the distance measurement values is to obtain the plurality of distance measurement values by causing a variable wavelength laser to oscillate at a plurality of arbitrary wavelengths, wherein the step of measuring the wavelengths of the laser beams is to measure wavelengths of laser beams when the respective distance measurement values are obtained by the optical comb, and wherein the step of measuring the geometric distance is to calculate the geometric distance based on the obtained distance measurement values and the measured wavelengths.

In the lightwave interferometric distance measuring method, the step of obtaining the distance measurement values is to obtain the distance measurement values based on the laser beams oscillated from a plurality of lasers, wherein the step of measuring the wavelengths of the leaser beams is to measure the wavelengths of the laser beams oscillated from the lasers by the optical comb, and wherein the step of the measuring the geometric distance is to calculate the geometric distance based on the obtained distance measurement values and the measured wavelengths.

In the lightwave interferometric distance measuring method, the step of measuring the wavelengths of the laser beams is to measure the wavelengths by one frequency measuring system including the optical comb.

In the lightwave interferometric distance measuring method, the step of measuring the geometric distance is to obtain the geometric distance in which the air refractive index is corrected by using the distance measurement values obtained by the laser beams of arbitrary wavelengths and a constant which is defined by a combination of wavelengths.

In the lightwave interferometric distance measuring method, the step of measuring geometric distance is to calculate a plurality of geometric distances by combinations of two of three or more distance measurement values, and to determine the geometric distance in accordance with an average value of the geometric distances.

In the lightwave interferometric distance measuring method, the step of measuring the geometric distance is to determine the geometric distance L by: employing constants $A_i$ which are determined by a combination of three distance measurement values $D_1$, $D_2$, $D_3$ that are obtained by laser beams of respective wavelengths $\lambda_1$, $\lambda_2$, $\lambda_3$, that are from the interferometer body to the target, and that are affected by the air refractive index, and the wavelengths $\lambda_1$, $\lambda_2$, $\lambda_3$ of the laser beams; and using a following expression:

$$L = D_2 - A_1(D_2 - D_1) - A_2(D_3 - D_1) \qquad (2)$$

A distance measuring apparatus of the invention includes: a detector which obtain a plurality of distance measurement values by a lightwave interferometric measurement using laser beams of a plurality of wavelengths; an analyzer which accurately measures a geometric distance from a body of an interferometer to a target from the distance measurement values, while correcting a refractive index of air; and an optical comb which measures the wavelengths of the laser beams.

The distance measuring apparatus further includes a controller which measures an oscillation wavelength of a variable wavelength laser by using the optical comb, and performs a feedback control to obtain laser beams of a plurality of predetermined wavelengths.

The distance measuring apparatus can further include a variable wavelength laser which outputs the laser beams of a plurality of arbitrary wavelengths; and a frequency measuring apparatus which measures by the optical comb, measuring wavelengths of laser beams when respective distance measurement values are obtained, wherein the analyzer calculates the geometric distance using the measured wavelengths.

The distance measuring apparatus can further include a plurality of lasers which output the laser beams of the predetermined different wavelengths; and a frequency measuring apparatus which measures the wavelengths of the laser beams oscillated from the lasers by the optical comb, wherein the analyzer calculates the geometric distance based on the measured wavelenghts.

The distance measuring apparatus can further include one frequency measuring system which measures the wavelengths by using the optical comb.

In the distance measuring apparatus, the analyzer obtains the geometric distance in which the air refractive index is corrected, by using the distance measurement values obtained by the laser beams of arbitrary wavelengths and a constant which is defined by a combination of wavelengths.

In the distance measuring apparatus, the analyzer calculates plural geometric distances by combinations of two of three or more distance measurement values, and determines the geometric distance in accordance with an average value of the geometric distances.

In the distance measuring apparatus, the analyzer determines the geometric distance L by: employing constants $A_i$ which are determined by a combination of three distance measurement values $D_1$, $D_2$, $D_3$ that are obtained by laser beams of respective wavelengths $\lambda_1$, $\lambda_2$, $\lambda_3$, that are from the interferometer body to the target, and that are affected by the air refractive index, and the wavelengths $\lambda_1$, $\lambda_2$, $\lambda_3$ of the laser beams; and using a following expression:

$$L = D_2 - A_1(D_2 - D_1) - A_2(D_3 - D_1)$$

According to the invention, without using an expensive laser having a high stability, a distant measurement based on lightwave interference can be realized by using an inexpensive laser. Therefore, the production cost of the apparatus can be reduced. The wavelength can be freely selected without being restricted by an available laser wavelength, so that the theory of air-refractive index correction in the interferometric length measurement can be used effectively and easily.

DETAILED DESCRIPTION

Figure 2:
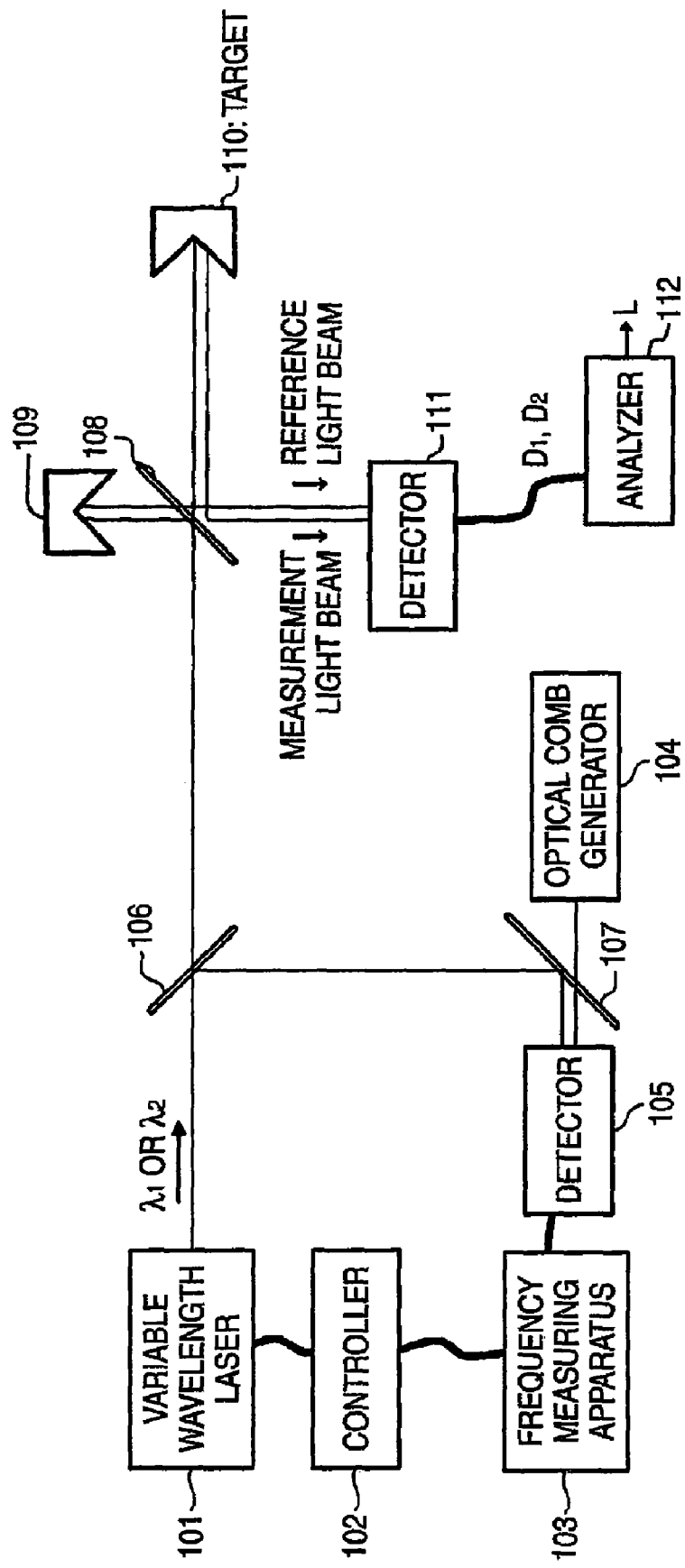
FIG. 2 is a block diagram showing the configuration of a first embodiment of the invention.

Hereinafter, embodiments of the invention will be described with reference to the drawings. FIG. 2 shows the configuration of a distance measuring apparatus which is a first embodiment of the invention.

In the embodiment, the laser beam output from a variable wavelength (frequency) laser 101 is split by a beam splitter 106. One light beam is split by a beam splitter 108. One light beam is reflected by a reference mirror 109 configured by a retroreflector or the like, to be formed as a reference light beam. The other light beam irradiates a target 110 which is the measurement object of the distance (displacement) configured by a retroreflector or the like, to obtain a light beam reflected therefrom as a measurement light beam. The measurement light beam is superimposed on the reference light beam by the beam splitter 108. A detector 111 receives signals of the reference and measurement light beams. On the basis of an interference intensity signal, the distance (displacement of the target 110) from the body of an interferometer to the target 110 is measured.

The light beam reflected from the beam splitter 106 is superimposed on an optical comb generated from an optical comb generator 104 through a beam splitter 107, and then received by a detector 105. A frequency measuring apparatus 103 frequency-analyzes a beat signal of the optical comb generated from the optical comb generator 104 and the laser beam oscillated from the variable wavelength laser 101, and a controller 102 feedback controls the oscillation wavelength (frequency) of the variable wavelength laser 101.

In order to measure the geometric distance L from the body of the interferometer to the target 110 in accordance with Expression (1) ($L = D_2 - A(D_2 - D_1)$), the oscillation wavelength of the variable wavelength laser 101 is feedback controlled to a predetermined wavelength $\lambda_1$ corresponding to the constant A while checking the beat signal of the laser beam oscillated from the variable wavelength laser 101 and the optical comb generated from the optical comb generator 104, thereby obtaining a distance measurement value $D_1$ based on lightwave interference. Next, similarly, a measurement is performed by using the laser beam of a predetermined wavelength $\lambda_2$ which is different from the wavelength $\lambda_1$, and an analyzer 112 calculates the geometric distance L in accordance with Expression (1), from the distance measurement values $D_1$, $D_2$ which are obtained respectively by the laser beams of the predetermined wavelengths $\lambda_1$, $\lambda_2$.

An measurement error $L_{error}$ of the geometric distance L based on errors $\delta\lambda_1$, $\delta\mu_2$ of the wavelengths $\lambda_1$, $\lambda_2$ is shown by following Expression (3) using results of partial differentiations of Expression (1) with respect to $\lambda_1$ and $\lambda_2$.

[Exp. 1]

$$L_{error} = \frac{An_1 L}{\lambda_1} \delta\lambda_1 + \frac{(1-A)n_2 L}{\lambda_2} \delta\lambda_2 \quad (3)$$

Herein, $n_1$ is a refractive index at $\lambda_1$, $n_2$ is a refractive index at $\lambda_2$, and A is the constant according to the oscillation wavelength to be used.

Figure 1:
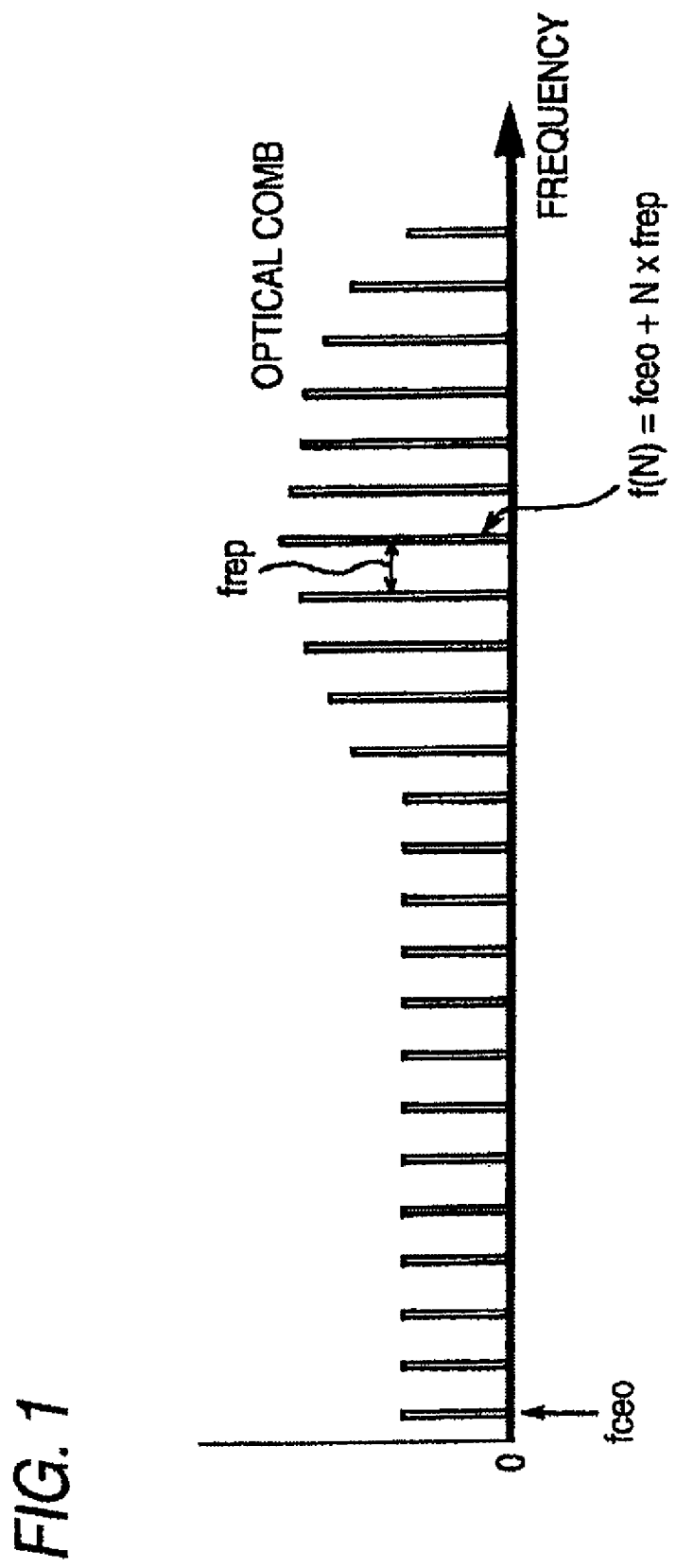
FIG. 1 is a view illustrating an optical comb used in the invention.

The optical comb generator 104 can measure the frequency of light with an accuracy of 15 or more digits by using a cesium atomic clock as a reference. As shown in FIG. 1, the optical comb is a laser beam in which lights having various wavelengths are arranged with equal intervals, like the teeth of a comb. In FIG. 1, $f_{rep}$ is a frequency spacing of the optical comb, $f_{ceo}$ is a fraction, and N is the order. Therefore, by the optical comb generator 104, the predetermined wavelengths $\lambda_1$, $\lambda_2$ can be controlled with an accuracy of up to 15 or more digits. The constant A is about two digits. Therefore, the measurement error $L_{error}$ due to wavelength variation of a laser beam can be enhanced an accuracy of up to 13 digits. This value indicates that, when a geometric distance of 1 m is interferometrically measured, the error is 1 pm or less.

The measurement procedure of the first embodiment is summarized as follows.
(1) The oscillation wavelength of the variable wavelength laser 101 is controlled to the designed wavelength $\lambda_1$.
(2) The interferometric measurement is performed to obtain the distance measurement value $D_1$.
(3) The oscillation wavelength of the variable wavelength laser 101 is controlled to the designed wavelength $\lambda_2$.
(4) The interferometric measurement is performed to obtain the distance measurement value $D_2$.
(5) The values $D_1$ and $D_2$ are substituted in Expression (1) using the value of the constant A of the previously designed wavelengths $\lambda_1$, $\lambda_2$, to calculate the geometric distance L.

Figure 3:
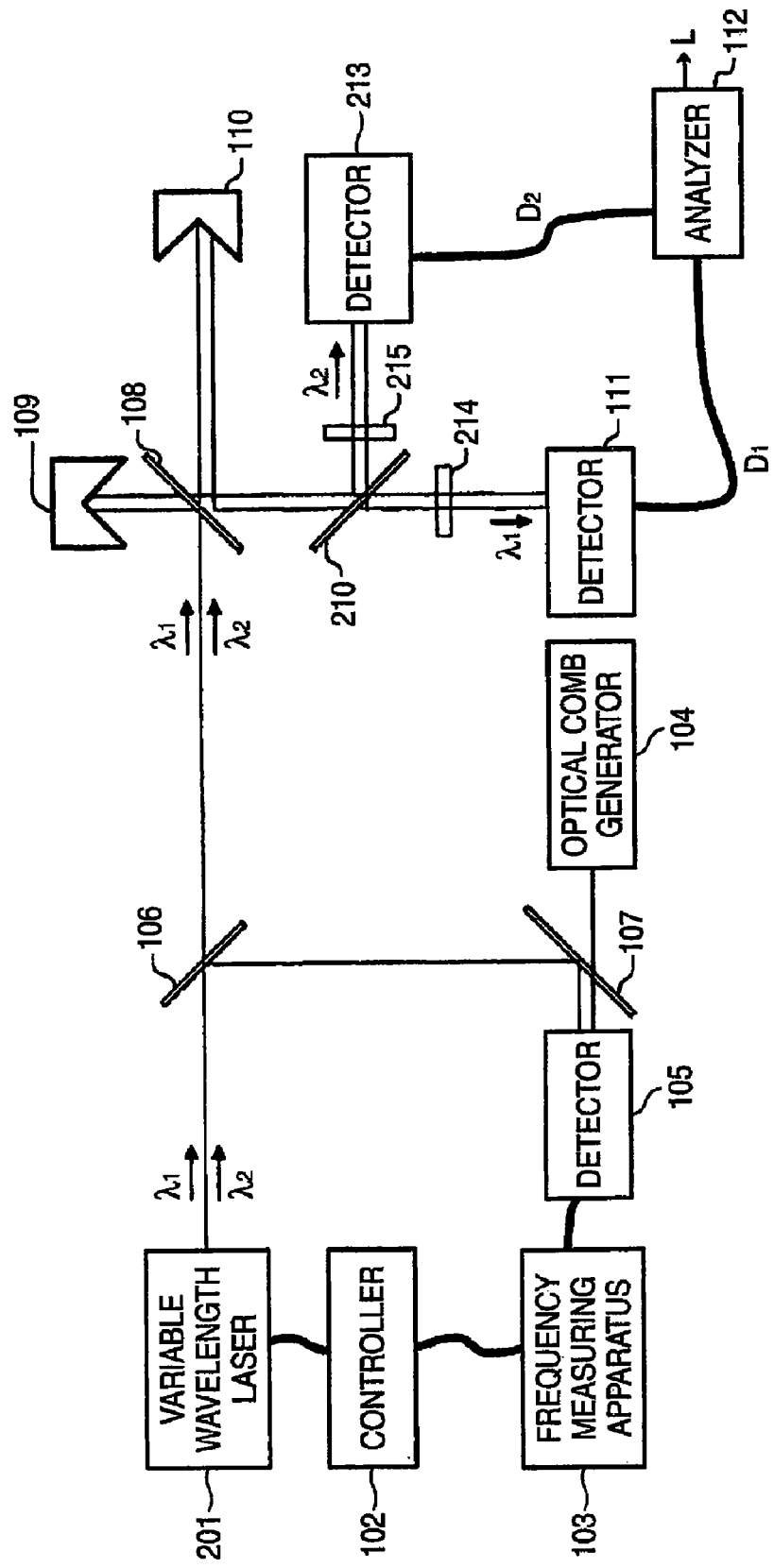
FIG. 3 is a block diagram showing the configuration of a second embodiment of the invention.

FIG. 2 shows the method in which the oscillation wavelength of the one variable wavelength laser 101 is made variable to the wavelengths $\lambda_1$, $\lambda_2$ and distances to the target are sequentially measured. As in a second embodiment shown in FIG. 3, alternatively, a variable wavelength laser 201 which simultaneously outputs two or more wavelengths is used, and an optical system (a beam splitter 210, and bandpass filters 214, 215) in which an interference signal due to the laser beams of the predetermined wavelengths $\lambda_1$, $\lambda_2$ are split and the split signals are simultaneously received and detectors 111, 213 may be disposed. In this case, frequency measuring systems for the variable wavelength laser 201 and configured by the detector 105 and the frequency measuring apparatus 103 may be prepared respectively for the wavelengths $\lambda_1$, $\lambda_2$, or, as shown in FIG. 3, one frequency measuring system may measure the both wavelengths (frequencies) $\lambda_1$, $\lambda_2$, and the laser may be controlled.

Figure 4:
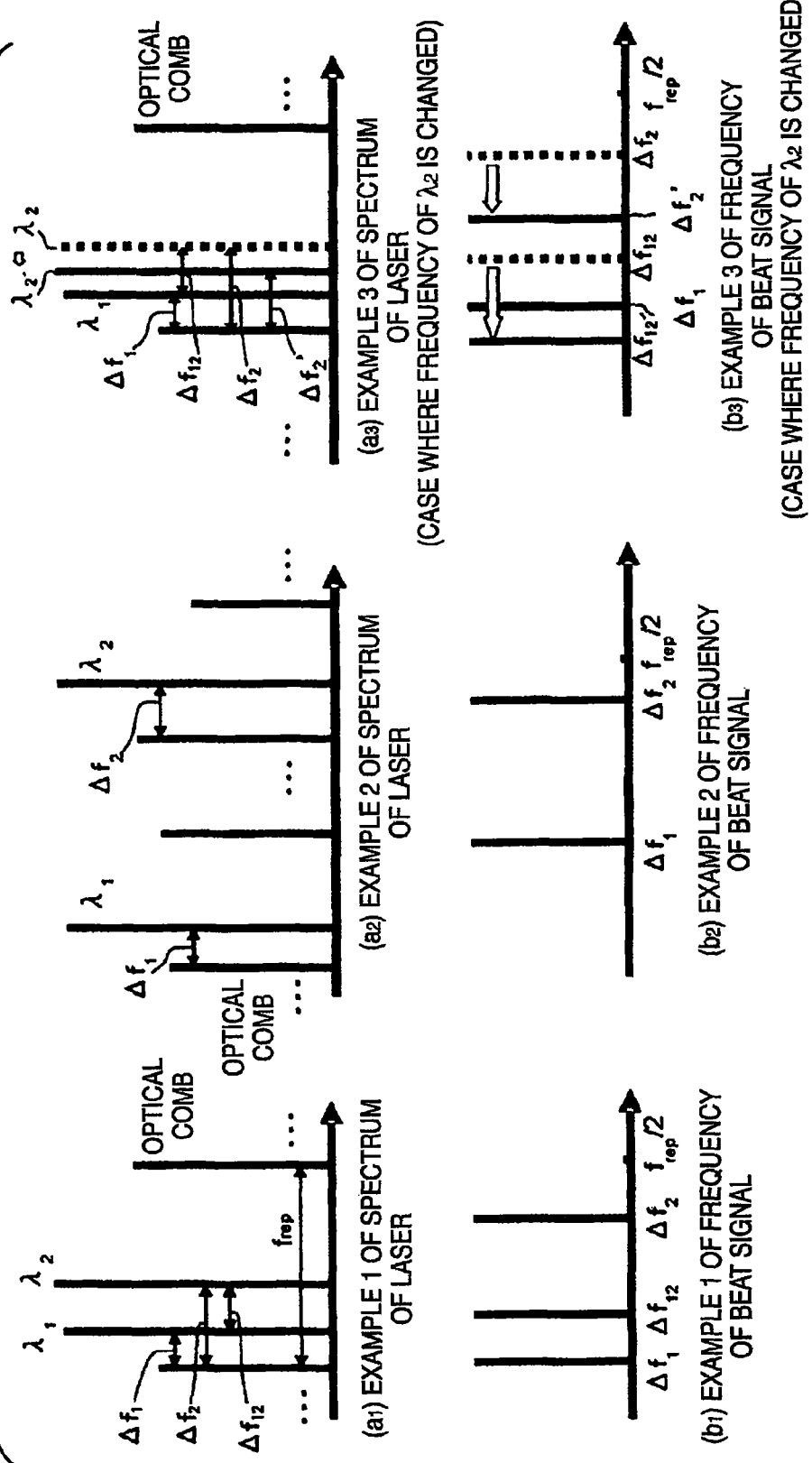
FIG. 4 is a view showing examples of the spectrum of a laser and the frequency of a beat signal used in the invention.

FIG. 4 diagrammatically shows examples of the oscillation spectrum of the laser and an interference beat signal obtained in the case of the spectrum. In the case where, as shown in ($a_1$) of FIG. 4, an interference beat signal of the laser beams of the predetermined wavelengths $\lambda_1$, $\lambda_2$ and the optical comb of the optical comb generator 104 is observed in a range of ½ of the frequency spacing $f_{rep}$ of the optical comb of the optical comb generator 104, beat signals $\Delta f_1$, $\Delta f_2$, $\Delta f_{12}$ the number of which is equal to that of combinations of the differences are observed as shown in ($b_1$) of FIG. 4. By contrast, in the case where, as shown in ($a_2$) of FIG. 4, the laser beams of the predetermined wavelengths $\lambda_1$, $\lambda_2$ interfere with different frequencies (orders) of the optical comb of the optical generator 104, the beat signals $\Delta f_1$, $\Delta f_2$ of frequencies of the differences of the wavelengths $\lambda_1$, $\lambda_2$ and respective neighboring light beams of the optical comb are detected as shown in ($b_2$) of FIG. 4. Under such circumstances, when one (in the figure, $\lambda_2$) of the wavelengths is changed as shown in ($a_3$) of FIG. 4, the frequencies of the beat signals are changed correspondingly with the wavelength change. When this phenomenon is used, one frequency measuring system can distinguish the wavelengths $\lambda_1$, $\lambda_2$ from each other.

Figure 5:
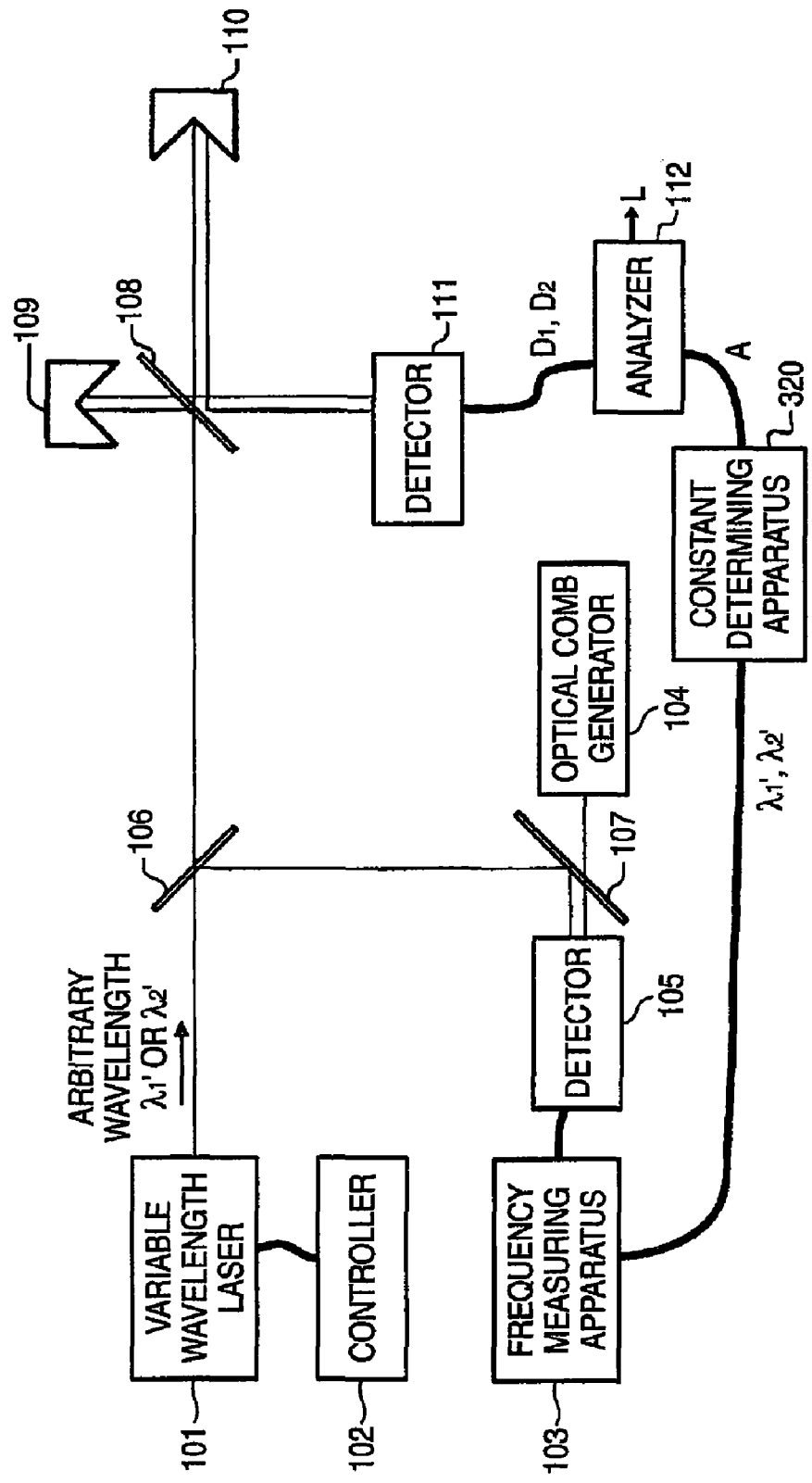
FIG. 5 is a block diagram showing the configuration of a third embodiment of the invention.

When the invention is used, the invention may be applied also to an interferometric measurement in the configuration such as a third embodiment shown in FIG. 5.

In the third embodiment, the variable wavelength laser 101 is caused to oscillate at an arbitrary wavelength $\lambda_1'$ to obtain the distance measurement value $D_1$. Next, the variable wavelength laser 101 is caused to oscillate at an arbitrary wavelength $\lambda_2'$ which is different from the wavelength $\lambda_1'$, to obtain the distance measurement value $D_2$. The correct wavelengths at which the distance measurement values $D_1$, $D_2$ are respectively obtained are measured by the frequency measuring system configured by the detector 105, the frequency measuring apparatus 103, and the like, and the results are reflected to the value of the constant A of Expression (1), thereby calculating the geometric distance L.

The constant A is a value which is determined by a combination of wavelengths. With respect to the constant A, therefore, a calculation table, a function, or the like which corresponds to the combination of wavelengths may be previously prepared, and, in accordance with the combination of wavelengths, a constant determining apparatus 320 may read out a necessary value in a range where an error of the constant A does not affect the geometric distance L. The function of the constant determining apparatus 320 may be incorporated into the analyzer 112.

In the embodiment, a special apparatus for controlling the wavelength of the variable wavelength laser 101 is not required, and a laser in which the current is variable and the frequency can be easily changed, such as a semiconductor laser can be used. Therefore, the measuring apparatus can be very simplified.

The measurement procedure of the embodiment is summarized as follows.
(1) The variable wavelength laser 101 is caused to oscillate at the arbitrary wavelength $\lambda_1'$.
(2) The interferometric measurement is performed to obtain the distance measurement value $D_1$, and at the same time the correct oscillation wavelength $\lambda_1$ at this time is measured.
(3) The variable wavelength laser 101 is caused to oscillate while the wavelength is changed to the other wavelength $\lambda_2'$.
(4) The interferometric measurement is performed to obtain the distance measurement value $D_2$, and at the same time the correct oscillation wavelength $\lambda_2$ at this time is measured.
(5) The distance measurement values $D_1$ and $D_2$ are substituted in Expression (1) using the constant A due to the combination of the correct wavelengths $\lambda_1$, $\lambda_2$, to calculate the geometric distance L.

Figure 6:
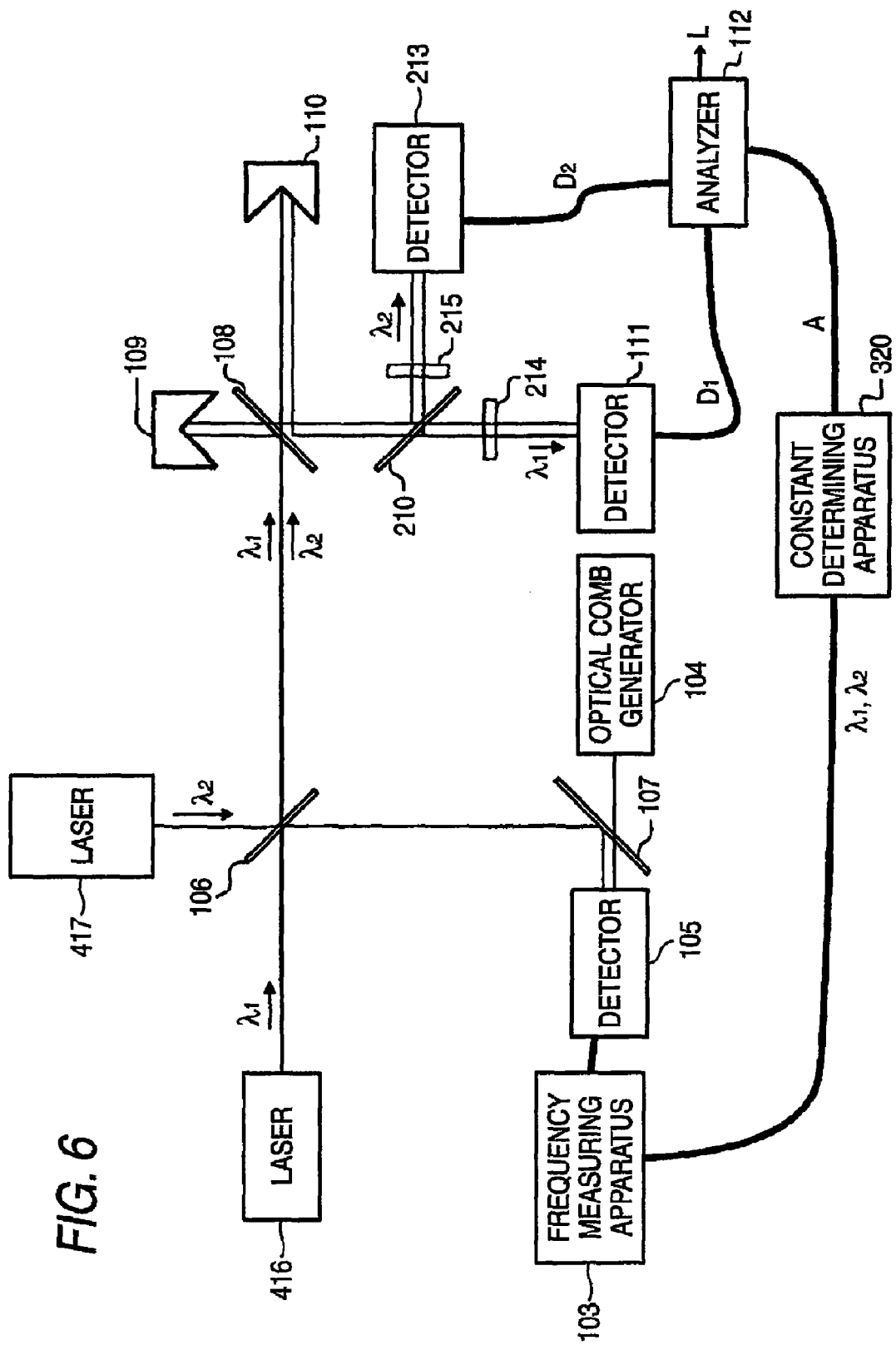
FIG. 6 is a block diagram showing the configuration of a fourth embodiment of the invention.

In the case where the technique of the invention is employed, even when an inexpensive laser having a low stability of the oscillation wavelength is used as in a fourth embodiment shown in FIG. 6, an accurate measurement of the geometric distance L can be realized.

In the embodiment, a laser 416 which outputs the laser beam of the wavelength $\lambda_1$, and a laser 417 which outputs the laser beam of the wavelength $\lambda_2$ impinge on the interference optical system configured by the reference mirror 109 and the target 110, while being coaxially superimposed on each other. From the laser beams of the wavelengths $\lambda_1$, $\lambda_2$, the distance measurement values $D_1$, $D_2$ are obtained, and the geometric distance L is calculated in accordance with Expression (1). As the correct values of the oscillation wavelengths $\lambda_1$, $\lambda_2$ in this case, values obtained by the frequency measuring system configured by the detector 105 and the frequency measuring apparatus 103 may be used, and, as the constant A, values which are derived on the basis of the wavelengths $\lambda_1$, $\lambda_2$ which are correctly measured by the above-described method may be used. In the embodiment in which the wavelengths $\lambda_1$, $\lambda_2$ at the instants when the distance measurement values $D_1$, $D_2$ are respectively measured are obtained, even when the frequencies of the lasers 416, 417 are unstable, the unstable frequencies do not largely affect the geometric distance L.

Figure 7:
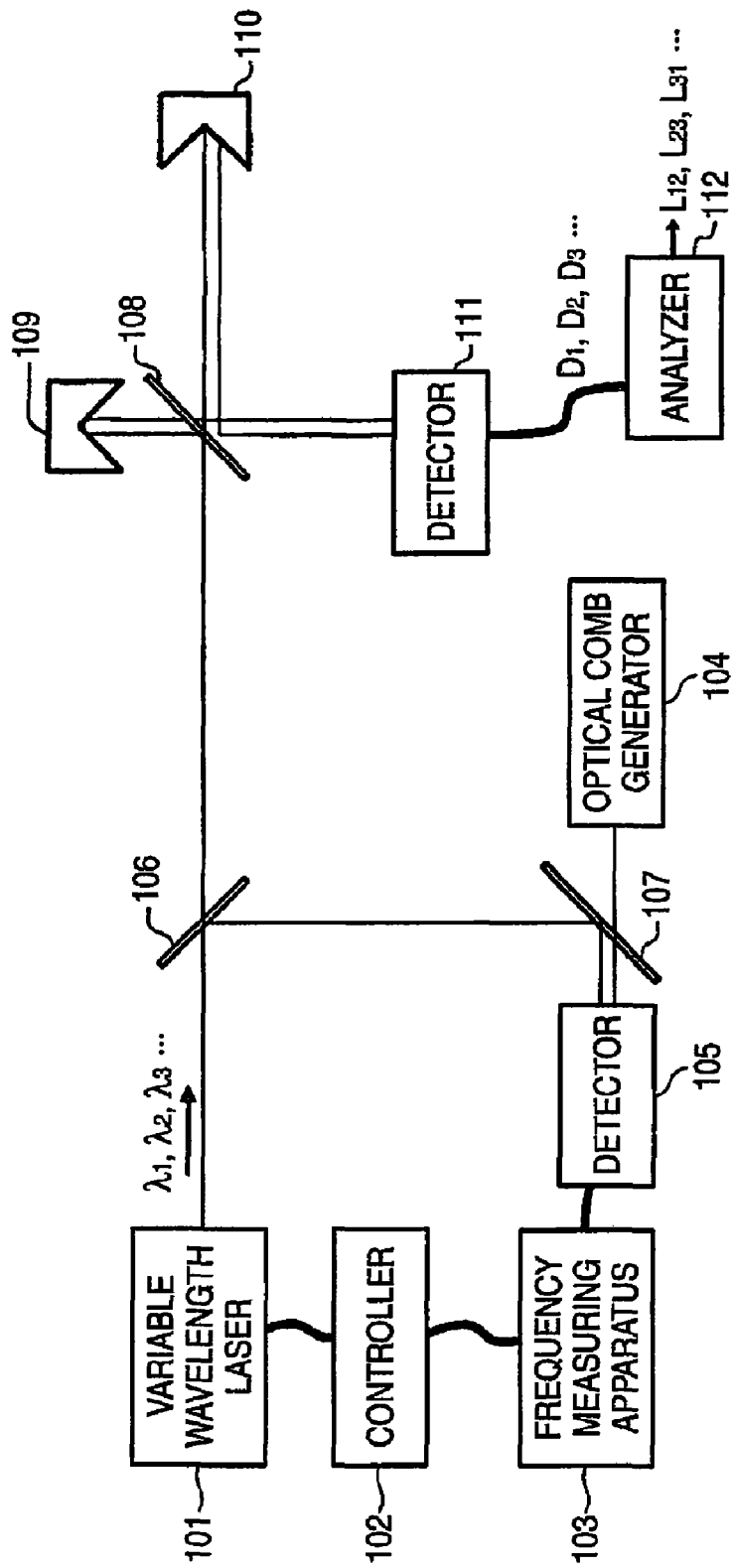
FIG. 7 is a block diagram showing the configuration of a fifth embodiment of the invention.

In the above, the method of refractive index correction using the two-wavelength laser has been described. Alternatively, as in a fifth embodiment shown in FIG. 7, a plurality of or at least three wavelengths may be used so that refractive index correction is performed more accurately.

In the embodiment, for example, distance measurement values $D_1, D_2, D_3, \ldots$ are obtained by the laser beams of the wavelengths $\lambda_1, \lambda_2, \lambda_3, \ldots$ output from the variable wavelength laser 101, geometric distances $L_{12}, L_{23}, L_{31}, \ldots$ are calculated by respective combinations of the values, and the average value of the distances is obtained, whereby a measurement of the geometric distance L which is more accurate than the case of two wavelengths can be realized.

Alternatively, for example, constants $A_i$ which are determined by a combination of three distance measurement values $D_1, D_2, D_3$ and the wavelengths may be used, and the constants may be substituted in above-described Expression (2) ($L=D_2-A_1(D_2-D_1)-A_2(D_3-D_1)$) to determine the geometric distance L.

When the geometric distance L is determined by using a plurality of or at least four wavelengths, the above-described method is more effective. Alternatively, distance measurement values $D_1, D_2, D_3, \ldots$ may be obtained by three or more arbitrary wavelengths $\lambda_1, \lambda_2, \lambda_3, \ldots$ the laser beams of the wavelengths $\lambda_1, \lambda_2, \lambda_3, \ldots$ at the instants when the distance measurement values $D_1, D_2, D_3, \ldots$ are respectively measured may be correctly measured by using the optical comb, and the geometric distance L may be calculated by using the constants $A_i$ corresponding to the combination of wavelengths.

In the embodiment, even when the number of wavelengths is increased, expensive lasers having a high stability are not individually required for the respective wavelengths, and hence a more accurate measurement of the geometric distance L can be easily realized.

The measurement procedure of the embodiment is summarized as follows.

(1) The oscillation wavelength of the variable wavelength laser 101 is controlled to the designed wavelength $\lambda_1$.
(2) The interferometric measurement is performed to obtain the distance measurement value $D_1$.
(3) The oscillation wavelength of the variable wavelength laser 101 is controlled to the designed wavelength $\lambda_2$.
(4) The interferometric measurement is performed to obtain the distance measurement value $D_2$.
(5) The oscillation wavelength of the variable wavelength laser 101 is controlled to the designed wavelength $\lambda_3$.
(6) The interferometric measurement is performed to obtain the distance measurement value $D_3$.
(7) The geometric distance L is calculated by Expression (3) using the constants $A_i$ corresponding to the combination of the wavelengths $\lambda_1, \lambda_2, \lambda_3$ based on the distance measurement values $D_1, D_2$, and $D_3$.

Figure 8:
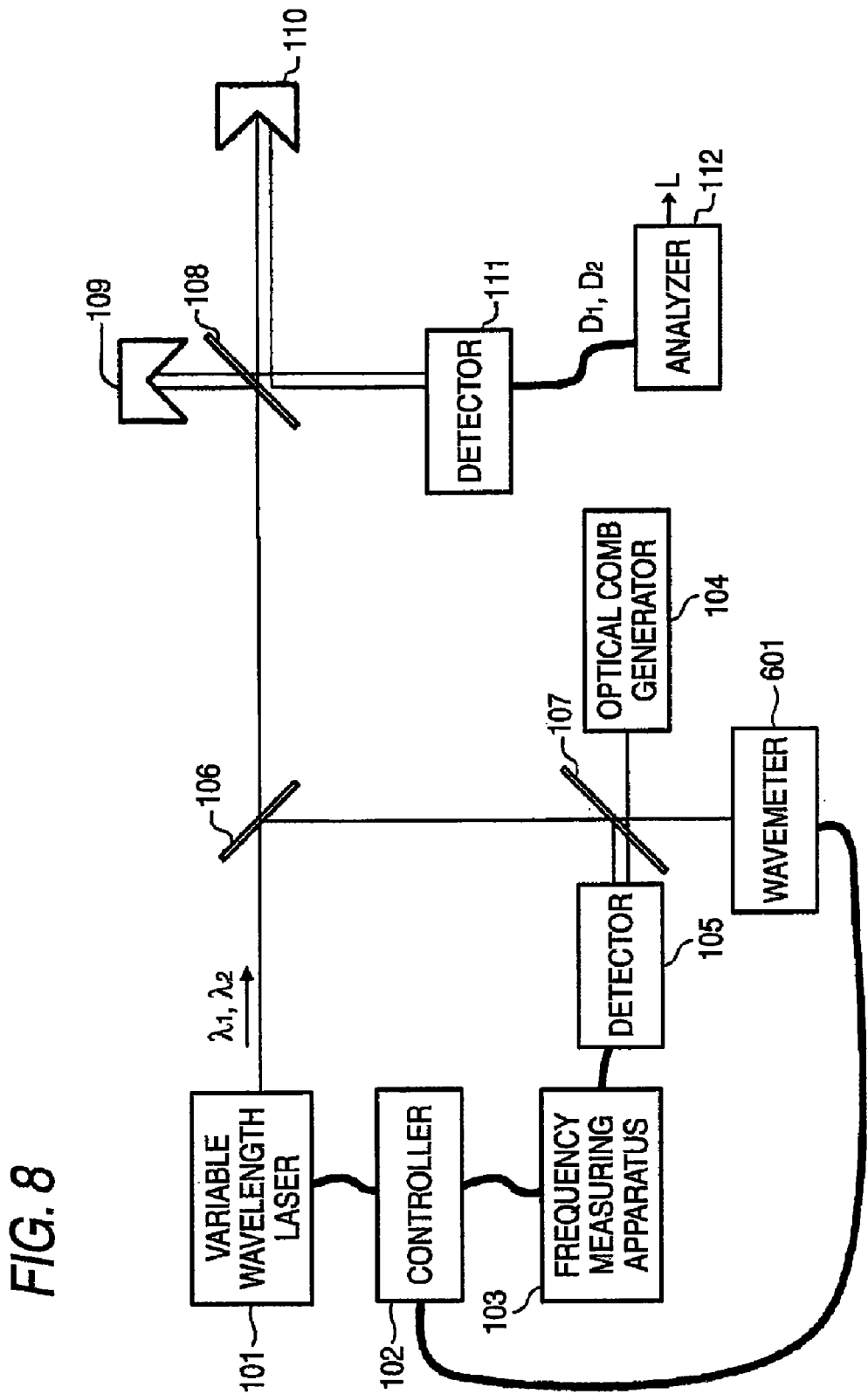
FIG. 8 is a block diagram showing the configuration of a sixth embodiment of the invention.

In each of the embodiments, basically, the optical comb generator 104 which is described as an apparatus for measuring the frequency of a light beam can perform high resolution on each restricted frequency region in the spectral spacing of the comb. Among light beams the frequencies in the optical comb 104, therefore, the light beam of the frequency with which interference is caused to produce the beat signal must be determined, or namely the order N must be separately determined. In the case where the order N cannot be determined because of reserved values of the oscillation frequency of the laser, the resolution of the laser frequency in the case of variation, or the like, as in a sixth embodiment shown in FIG. 8, the order N may be determined in combination with means for measuring the wavelength, such as a wavemeter 601, the wavelengths $\lambda_1, \lambda_2$ of the variable wavelength laser 101 may be measured, and the order may be used in the control of the oscillation frequency. Alternatively, in combination with the second embodiment shown in FIG. 3, the order may be used in the calculation of the geometric distance L.

In the above-described embodiments, a retroreflector which is identical with the target 110 is used as the reference mirror 109. Therefore, the optical axes can be easily aligned with each other, and the adjustment can be facilitated. The kind of the reference mirror is not restricted to a retroreflector, and may be a planar mirror.

What is claimed is:

1. A lightwave interferometric distance measuring method, the method comprising:
   obtaining a plurality of distance measurement values by a lightwave interferometric measurement using simultaneously-output laser beams of plural wavelengths;
   accurately determining a determined geometric distance from a body of an interferometer to a target from the distance measurement values, while correcting a refractive index of air; and
   measuring the wavelengths of the laser beams by using a frequency-measuring system comprising an optical comb and one detector onto which the laser beams of plural wavelengths are simultaneously incident,
   wherein the obtaining the distance measurement values is to obtain the distance measurement values based on the laser beams oscillated from a plurality of lasers,
   wherein the measuring the wavelengths of the laser beams is to measure the wavelengths of the laser beams oscillated from the lasers by the optical comb, and
   wherein determining the determined geometric distance includes calculating a plurality of geometric distances by combinations of two of three or more distance measurement values, and determining the determined geometric distance in accordance with an average value of the calculated plurality of geometric distances.

2. A lightwave interferometric distance measuring method according to claim 1, further comprising:
   obtaining laser beams of a plurality of predetermined wavelengths by performing a feedback control based on an oscillation wavelength of a variable wavelength laser measured by using the optical comb.

3. A lightwave interferometric distance measuring method according to claim 1,
   wherein the obtaining the distance measurement values is to obtain the plurality of distance measurement values by causing a variable wavelength laser to oscillate at a plurality of arbitrary wavelengths,
   wherein the measuring the wavelengths of the laser beams is to measure wavelengths of laser beams when the respective distance measurement values are obtained by the optical comb, and
   wherein the determining the determined geometric distance includes using the measured wavelengths.

4. A lightwave interferometric distance measuring method according to claim 3,
   wherein determining the determined geometric distance includes obtaining the geometric distance in which the air refractive index is corrected by using the distance measurement values obtained by the laser beams of arbitrary wavelengths and a constant which is defied by a combination of wavelengths.

5. A lightwave interferometric distance measuring method according to claim 1,
   wherein determining the determined geometric distance includes determining the geometric distance L by using a following expression:

$$L=D_2-A(D_2-D_1)-A_2(D_3-D_1)$$

wherein A1 and A2 are constants, and
$D_1, D_2, D_3$ are three distance measurement values that are obtained by laser beams of respective wavelengths $\lambda_1, \lambda_2, \lambda_3$ that are from the interferometer body to the target, and that are affected by the air refractive index and the wavelengths $\lambda_1, \lambda_2, \lambda_3$ of the laser beams.

* * * * *